United States Patent [19]
McIntosh

[11] 3,774,148
[45] Nov. 20, 1973

[54] AUDIO MONITORED VEHICLE HEADLIGHT CIRCUIT
[75] Inventor: Duane E. McIntosh, Palmyra, Wis.
[73] Assignee: General Motors Corporation, Detroit, Mich.
[22] Filed: Oct. 16, 1972
[21] Appl. No.: 297,918

[52] U.S. Cl.................... 340/52 R, 315/83, 340/75, 340/384 E
[51] Int. Cl.............................................. B60q 1/14
[58] Field of Search.............................. 315/77, 83; 340/52 R, 62, 75, 76, 384 E

[56] References Cited
UNITED STATES PATENTS
| | | | |
|---|---|---|---|
| 2,579,292 | 12/1951 | Brelsford | 340/62 |
| 2,734,181 | 2/1956 | Warneck | 340/62 X |
| 2,787,778 | 4/1957 | Mulrooney | 340/75 |
| 2,910,688 | 10/1959 | Kelley et al. | 340/384 E |
| 3,493,966 | 2/1970 | Human | 340/384 E |
| 3,671,802 | 6/1972 | Ballou | 315/83 |

FOREIGN PATENTS OR APPLICATIONS
326,072  1/1958  Switzerland.......................... 340/74

Primary Examiner—Kenneth N. Leimer
Attorney—C. R. Meland et al.

[57] ABSTRACT

A vehicle headlight circuit including high and low beam filaments selectively energized by a dimmer switch having a pair of output terminals coupled respectively thereto. A first set of normally open auxiliary contacts is series connected with one of the output terminals, a first audio oscillator operating at a first frequency and a speaker. A second set of normally open auxiliary contacts is series connected with the other output terminal, a second audio oscillator operating at a second frequency and the speaker. An actuator on the dimmer switch is effective for closing the first and second sets of normally open auxiliary contacts upon partial actuation of the dimmer switch to energize one of the oscillators to provide an audio indication of high or low beam filament energization.

2 Claims, 1 Drawing Figure

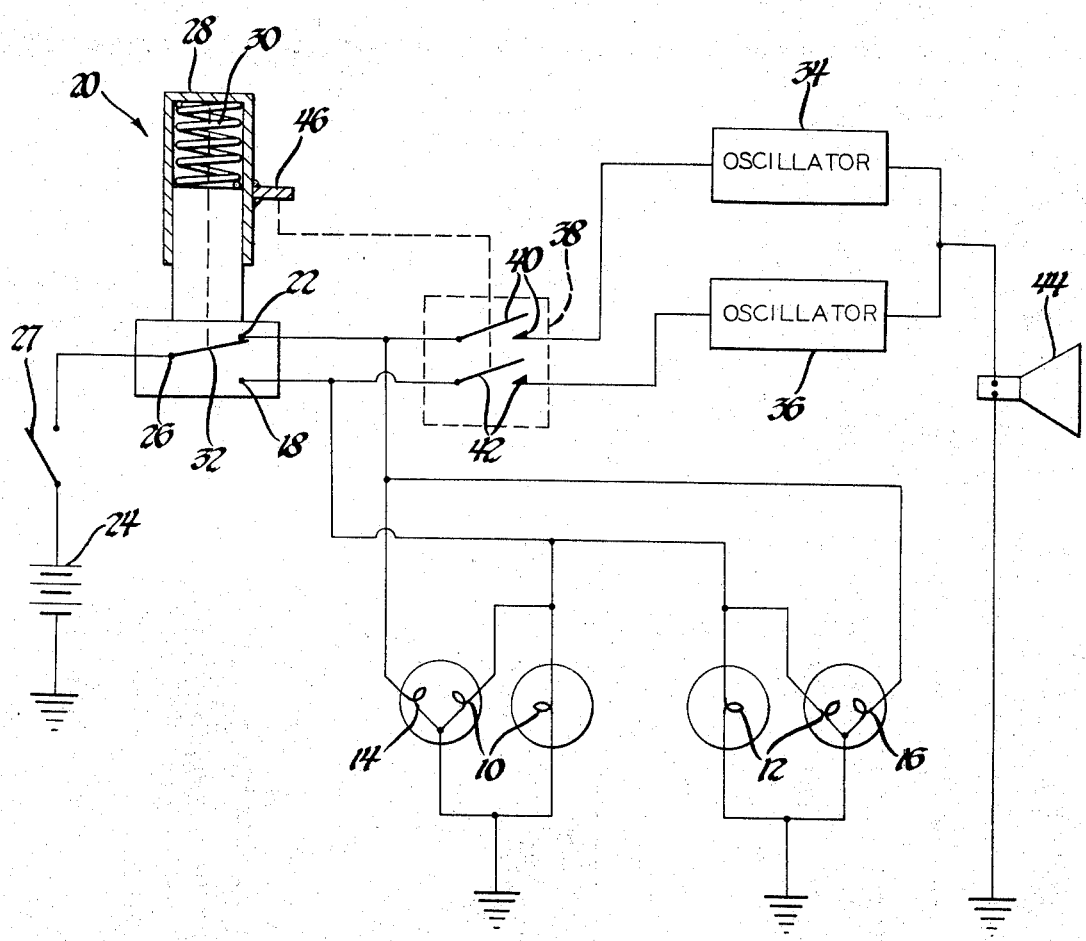

AUDIO MONITORED VEHICLE HEADLIGHT CIRCUIT

This invention relates to a vehicle headlamp beam condition indicator and, more specifically, this invention relates to an audible beam condition indicator in which an audible signal representative of the high or low beam condition is provided.

Conventional headlamp beam condition indicators provide a visual indication which represents the low or high beam condition of the vehicle beam. For example, when the vehicle headlamps are on high beam, a light is continually illuminated to provide information of this condition to the vehicle operator. As opposed to this form of indicator, it is the general object of this invention to provide an audible indication of the condition of the vehicle headlamp beam.

It is another object of this invention to provide an apparatus for generating an audible signal of a first frequency when the vehicle headlamps are on low beam and for generating an audible signal of a second frequency when the vehicle headlamps are on high beam.

It is another object of this invention to provide an audible headlamp beam indicator in which an audible indication of the high or low beam condition of the vehicle headlamps is provided upon the partial actuation of the vehicle headlamp dimmer switch.

These and other objects of this invention may be better understood by reference to the following description of a preferred embodiment and the single figured drawing which is a schematic of the preferred embodiment of this invention.

Referring to the drawing, there is shown a vehicle headlamp lighting circuit for energizing the left high beam filaments 10, the right high beam filaments 12, the left low beam filament 14 and the right low beam filament 16. The left and right high beam filaments 10 and 12 are connected in parallel between ground and an output terminal 18 of a dimmer switch assembly 20. The left and right low beam filaments 14 and 16 are connected in parallel between ground and a second output terminal 22 of the dimmer switch assembly 20. A voltage source 24 which may be, for example, the vehicle battery, has its negative terminal grounded and its positive terminal connected to an input terminal 26 of the dimmer switch assembly 20 through a light switch 27.

The dimmer switch assembly 20 includes an actuating shell 28 which is biased in an upward or neutral position by a spring 30. The actuating shell 28 is mechanically associated with a contact member 32, which either couples the input terminal 26 to the output terminal 18 or the output terminal 22, such that when the actuating shell 28 is fully depressed, the contact member 32 is moved to couple the input terminal 26 to the other one of the output terminals 18 or 22. Repeated actuations of the actuating shell 28 function to alternately connect the input terminal 26 to the output terminals 18 and 22. The switching elements of the dimmer switch assembly 20 including the contact member 32 and input terminal 26 and the output terminals 18 and 22 can take the form of a ratcheting mechanism operated by the depression of the actuating shell 28 or any other of the well known forms of dimmer switches.

As can be seen, when the light switch 27 is closed, the left and right high beam filaments 10 and 12 or the left and right low beam filaments 14 and 16 are selectively energized by the actuation of the actuating shell 28 to position the contact member 32 to engage the output terminal 18 or 22 to apply the potential of the voltage source 24 across the respective filaments 10 and 12 or 14 and 16.

To provide for an audible indication of which of the high or low beam filaments 10 and 12 or 14 and 16 are energized, an oscillator 34 and an oscillator 36 are provided. The oscillator 34 is responsive to an applied voltage for generating an alternating signal having a frequency $F_1$ in the audible frequency range and the oscillator 36 is responsive to an applied voltage for generating an alternating signal having a frequency $F_2$ in the audible frequency range. The oscillators 34 and 36 are of conventional design and, consequently, will not be described in greater detail.

A switch assembly 38 includes a first set of normally open contacts 40 connected between the output terminal 22 of the dimmer switch assembly 20 and the input of the oscillator 34. The switch assembly 38 also includes a set of normally open contacts 42 connected between the output terminal 18 of the dimmer switch assembly 20 and the input of the oscillator 36. The outputs of the oscillators 34 and 36 are coupled together and an audio speaker 44 is coupled between the outputs of the oscillators 34 and 36 and ground. The speaker 44 is positioned within the vehicle compartment so that the vehicle operator can readily hear the audio output thereof.

The dimmer switch 20 includes an actuating member 46 secured thereto which is operatively associated with the switch assembly 38 so as to close the sets of normally open contacts 40 and 42 upon a partial depression of the actuating shell 28, the partial depression being insufficient for shifting the contacting member 32 between the output terminals 18 and 22. When the light switch 27 is closed, the left and right low beam filaments 14 and 16 are energized if the contactor 32 is in engagement with the output terminal 22 and the left and right high beam filaments 10 and 12 are energized when the contactor 32 engages the output terminal 18. In order to determine whether the left and right high beam filaments 10 and 12 or the left and right low beam filaments 14 and 16 are energized, the vehicle operator partially depresses the actuating shell 28 sufficiently to close the sets of normally open contacts 40 and 42 but insufficient for shifting the contact member 32 between the output terminals 18 and 22. Upon the closure of the sets of normally open contacts 40 and 42, the potential of the voltage source 24 is applied to the input of the oscillator 34 if the contact member 32 is in engagement with the output terminal 22 and is applied to the input of the oscillator 36 when the contact member 32 is in engagement with the output terminal 18. If the left and right low beam filaments 14 and 16 are energized, the oscillator 34 is energized by the power applied to the input thereof to supply a signal having the frequency $F_1$ to the audio speaker 44 which emits an audible sound having the frequency $F_1$ to indicate that the left and right low beam filaments 14 and 16 are energized. If the left and right high beam filaments 10 and 12 are energized, the oscillator 36 is energized by the power applied to the input thereof and supplies a signal having the frequency $F_2$ to the audio speaker 44 which emits an audible sound having the frequency $F_2$ to indicate that the high beam filaments 10 and 12 are energized. The frequencies $F_1$ and $F_2$ are sufficiently spaced so as to be readily distinguishable by the vehicle operator.

Although the normally open switch assembly 38 is shown to be external to the dimmer switch 20 and actuated by an actuator 46 secured to the dimmer switch 20, it is understood that the normally open switch assembly 38 can be mounted internal of the dimmer switch assembly and in fact could be a portion or a modification of the ratcheting assembly comprising the contact member 32 and the output terminals 18 and 22.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. An audio headlight beam indicator for an automotive vehicle comprising: an automotive vehicle power source; a manually operable light switch; high and low beam headlamp filaments; a headlamp beam control switch having a power input terminal coupled to the vehicle power source through the manually operable light switch, first and second power output terminals coupled respectively to the high and low beam filaments, a contact member shiftable between the power output terminals for electrically bridging the power input terminal and one of the power output terminals to selectively energize the high or low beam headlamp filaments when the light switch is operated and a manually operable member movable from a neutral position to an actuated position to shift the contact member from one of the power output terminals to the other of the power output terminals to shift between high and low headlight beams; a first audio oscillator responsive to power supplied thereto for generating a signal having a frequency $F_1$; a second audio oscillator responsive to power supplied thereto for generating a signal having a frequency $F_2$; an audio speaker coupled to the first and second audio oscillators and responsive to the signals generated thereby for emitting an audible sound corresponding to the frequencies $F_1$ and $F_2$ thereof; means responsive to the movement of the manually operable member out of the neutral position towards the actuated position when the high beam filaments are energized for supplying power from the power source to the first oscillator; and means responsive to the movement of the manually operable member out of the neutral position towards the actuated position when the low beam filaments are energized for supplying power from the power source to the second oscillator, whereby the first audio oscillator and the audio speaker cooperate to provide an audio signal having the frequency $F_1$ when the high beam filaments are energized and the manually operable member is moved from its neutral position toward its actuated position and the second audio oscillator and the audio speaker cooperate to provide an audio signal having the frequency $F_2$ when the low beam filaments are energized and the manually operable member is moved from its neutral position toward its actuated position, the audio signals representing the headlamp beam condition.

2. An audio headlight beam indicator for an automotive vehicle comprising: an automotive vehicle power source; a manually operable light switch; high and low beam headlamp filaments; a headlamp beam control switch having a power input terminal coupled to the vehicle power source through the manually operable light switch, first and second power output terminals coupled respectively to the high and low beam filaments, a contact member shiftable between the power output terminals for electrically bridging the power input terminal and one of the power output terminals for selectively energizing the high or low beam headlamp filaments when the light switch is operated and a manually operable member movable from a neutral position to an actuated position to shift the contact member from one of the power output terminals to the other of the power output terminals to shift between high and low headlight beams; a first series circuit coupled to the first power output terminal, said first series circuit including a normally open switch, a first audio oscillator responsive to power applied thereto for generating a signal having a frequency $F_1$ and an audio speaker; a second series circuit coupled to the second power terminal, the second series circuit including a second normally open switch, a second audio oscillator responsive to power applied thereto for generating a signal having a frequency $F_2$ and the audio speaker; and means responsive to the movement of the manually operable member out of the neutral position towards the actuated position for closing the first and second normally open switches, whereby the first audio oscillator and the audio speaker cooperate to provide an audio signal having the frequency $F_1$ when the high beam filaments are energized and the manually operable member is moved from its neutral position toward its actuated position and the second audio oscillator and the audio speaker cooperate to provide an audio signal having the frequency $F_2$ when the low beam filaments are energized and the manually operable member is moved from its neutral position toward its actuated position, the audio signals representing the headlamp beam condition.

* * * * *